United States Patent [19]

Lo et al.

[11] Patent Number: 5,186,952
[45] Date of Patent: Feb. 16, 1993

[54] MOLD FOR MANUFACTURING TIRES

[75] Inventors: Tsai J. Lo; David Hwang, both of Chang Hua Hsien, Taiwan

[73] Assignees: Cheng Shin Rubber Ind., Co., Ltd.; Ming King Ind., Co., Ltd., both of Taiwan

[21] Appl. No.: 796,112

[22] Filed: Nov. 20, 1991

[51] Int. Cl.$^5$ .............................................. B29C 35/00
[52] U.S. Cl. ...................................... 425/36; 425/46; 425/55
[58] Field of Search ................ 425/28.1, 36, 46, 54, 425/55

[56] References Cited

U.S. PATENT DOCUMENTS

| 3,590,433 | 7/1971 | Rawls | 425/36 X |
| 3,850,555 | 11/1974 | Pasch | 425/46 |
| 3,989,791 | 11/1976 | Tippin | 425/46 X |
| 4,568,259 | 2/1986 | Mattson | 425/28.1 X |

Primary Examiner—Charles Hart
Attorney, Agent, or Firm—Robbins, Dalgarn, Berliner & Carson

[57] ABSTRACT

A mold including a pair of bodies engageable with each other and each including an annular recess, an annular groove and an annular depression, a ring being engaged in the annular recess and the annular groove respectively, and one or more rings corresponding to the tread portion of the tire being engaged in the annular depression of each of the bodies, a mold cavity for forming the tire being formed in the bodies and the rings, the rings engaged in the annular depressions being arranged in parallel with each other so that the rings can be stably and properly retained in place.

4 Claims, 3 Drawing Sheets

MOLD FOR MANUFACTURING TIRES

BACKGROUND OF THE INVENTION

1. Field of the Invention

The present invention relates to a mold, and more particularly to a mold for manufacturing tires.

2. Description of the Prior Art

A typical mold for manufacturing tires generally includes a plurality of ring elements coupled together so as to form a mold cavity therein. The mold cavity has a shape corresponding to that of a tire in order that a tire may be formed within the mold cavity. However, the ring elements can not be stably coupled together and may be shifted with one another so that the shape of the mold cavity may be deformed and so that a large amount of detective tires may be produced.

The present invention has arisen to mitigate and/or obviate the afore-described disadvantages of the mold for manufacturing tires.

SUMMARY OF THE INVENTION

The primary objective of the present invention is to provide a mold for manufacturing tires in which the ring elements can be stably held in place so that the shape of the mold cavity formed within the ring elements will not be deformed.

In accordance with one aspect of the invention, there is provided a mold including a pair of bodies engageable with each other, each of the bodies including an annular recess, an annular groove and an annular depression formed therein, a first ring engaged in the annular recess of each of the bodies and having a shape corresponding to the bead portion of a tire, a second ring engaged in the annular groove of each of the bodies and having a shape corresponding to the side wall portion of the tire, one or more third rings engaged in the annular depression of each of the bodies and having a shape corresponding to the tread portion of the tire, a mold cavity for forming the tire being formed in the bodies, the first rings, the second rings, and the third rings, the third rings being disposed and arranged in parallel with each other so that the third rings can be stably and properly retained in the annular depressions of the bodies.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
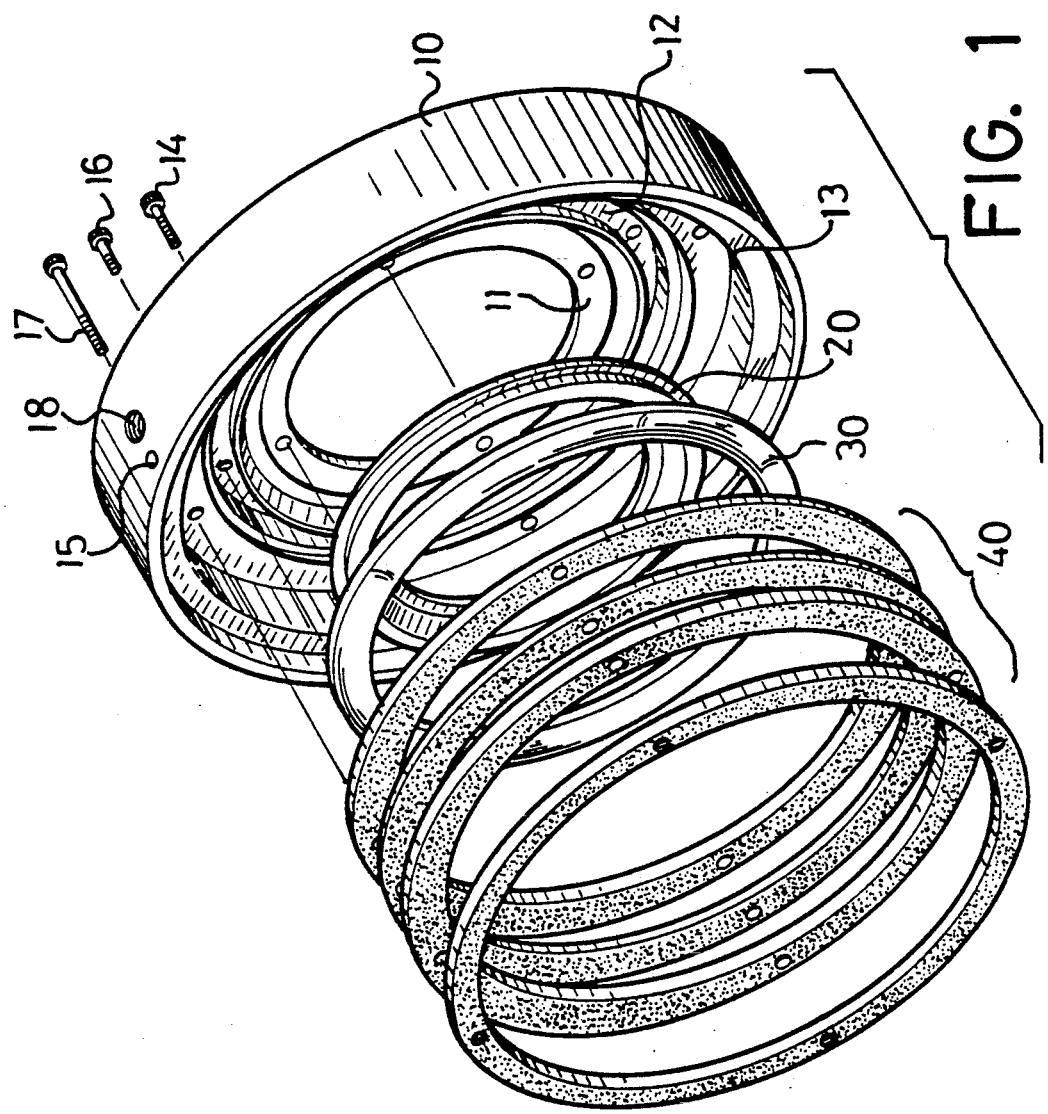
FIG. 1 is a partial exploded view of a mold in accordance with the present invention, in which, for clearly illustrative purposes, only one half of the mold is illustrated.
Figure 2:
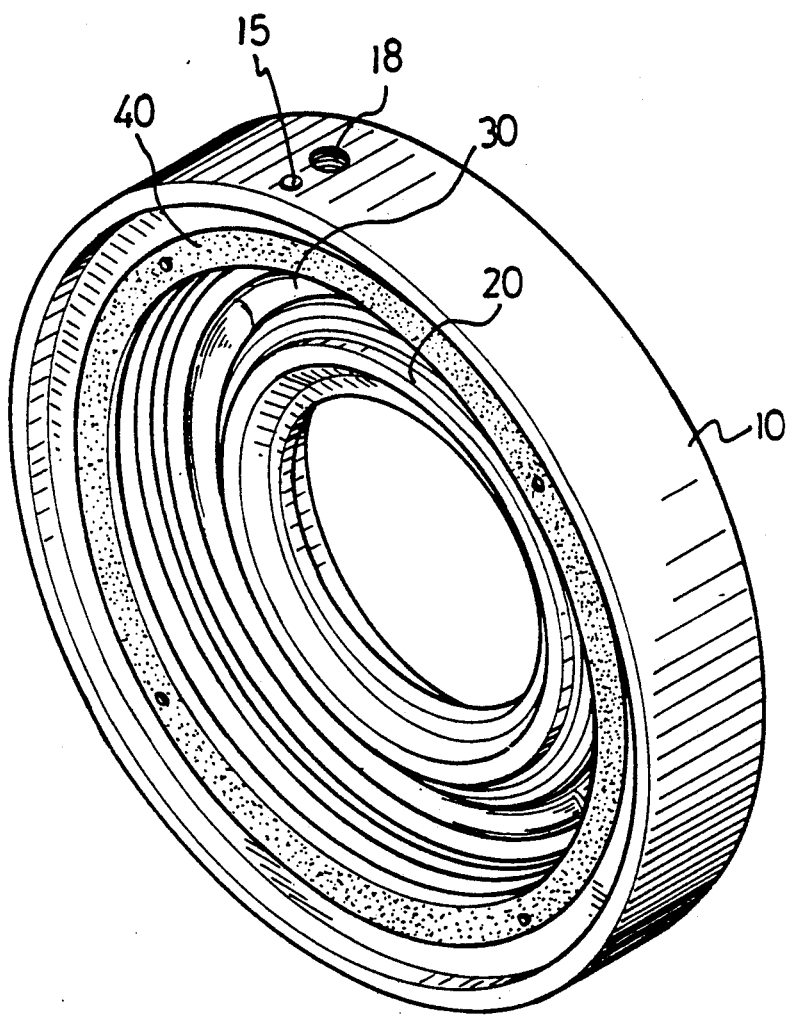
FIG. 2 is a perspective view of the mold, in which only one half of the mold is shown.
Figure 3:
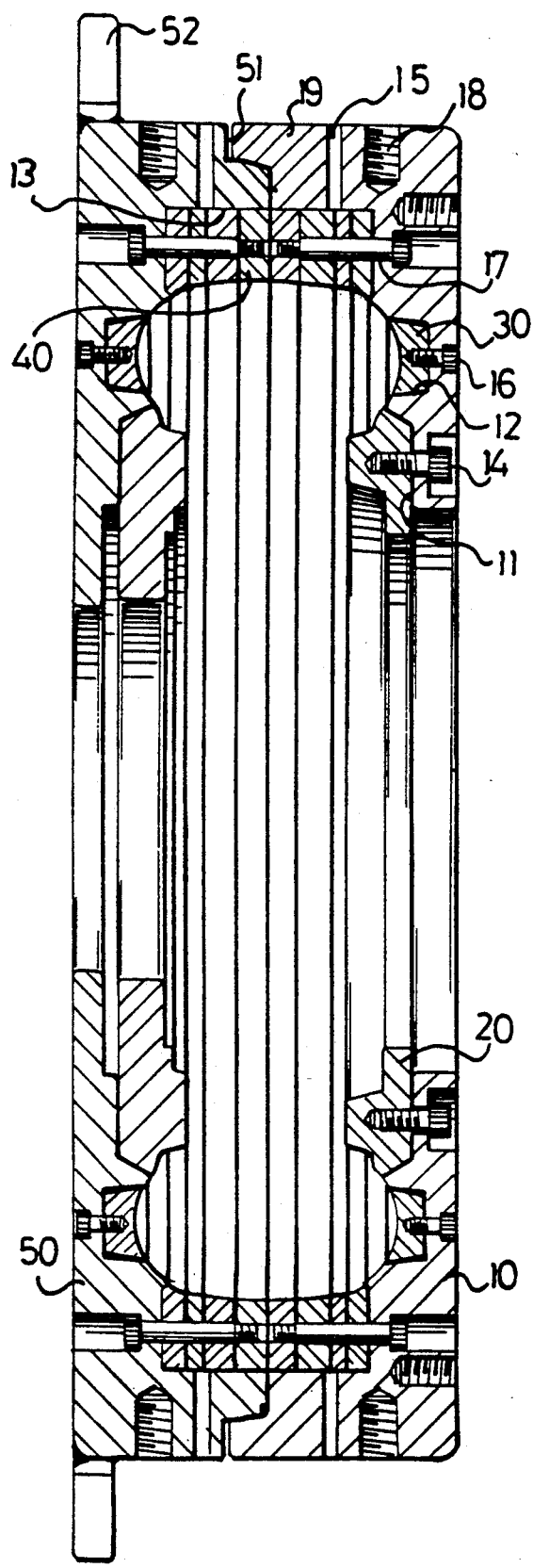
FIG. 3 is a cross sectional view of the mold.

Referring to the drawings and initially to FIGS. 1, 2 and 3, a mold in accordance with the present invention comprises generally a pair of bodies 10, 50 each including an annular recess 11, an annular groove 12 and an annular depression 13 formed therein. The bodies 10, 50 will be pressed toward each other during injection molding processes. A mold cavity, which will be described later, will be formed within the bodies 10, 50 corresponding to the shape of a tire to be manufactured.

A first body 10 includes an annular flange 19, and the second body 50 includes an annular shoulder 51 for engagement with the annular flange 19 of the first body 10 so that the body 10 will not move radially relative to the other body 50, and so that the mold cavity will not be deformed. This is very important particularly during injection molding processes. At least one air hole 15 and at least one screw hole 18 are formed in the outer peripheral portion of each of the bodies 10, 50. A hook (not shown) or the like can be threaded into the screw hole 18 so that the mold can be hung and can be transported. A lug 52 or the like is formed integral on the body 50 and can be fixed to such as an injection press so that the mold can be fixed in place during injection molding processes.

A first ring 20 is received in the annular recess 11 of each of the bodies 10, 50 and is fixed thereto by such as a plurality of bolts 14. The first ring 20 has a shape corresponding to the bead portion of the tires. A second ring 30 is received in the annular groove 12 of each of the bodies 10, 50 and is fixed thereto by such as a plurality of bolts 16. The second ring 30 has a shape corresponding to the side wall portion of the tires. Four third rings 40 are received in the annular depression 13 of each of the bodies 10, 50 and are fixed thereto by such as a plurality of bolts 17. The third rings 40 have a shape corresponding to the tread portion of the tires. The mold cavity for forming the tires to be made is formed within the bodies 10, 50 and the rings 20, 30, 40. It is to be noted that the third rings 40 are disposed and arranged in parallel with one another and preferably have identical outer diameter so that the third rings 40 can be stably and properly retained in place and so that the mold cavity will not be deformed.

Figure 4:
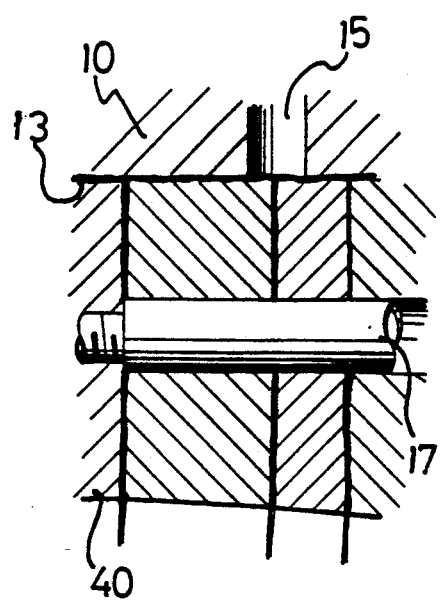
FIG. 4 is an enlarged cross sectional view illustrating part of the mold.

Referring next to FIG. 4, the inner surfaces of the annular depressions 13, and the side surfaces and the outer peripheral surfaces of the third rings 40 are made rough, the roughness of the surfaces ranges from 1.6 to 3.2 $\mu$m. Accordingly, an air passage will be formed among the third rings 40 and among the third rings 40 and the bodies 10, 50. The air contained within the mold may flow through the air passage formed among the bodies 10, 50 and the third rings 40 and may flow out via the air hole 15. Accordingly, no air holes or air passages should be formed within the third rings 40, so that the strength of the third rings 40 will not be affected.

Accordingly, the rings, particularly the third rings 40 of the mold in accordance with the present invention can be stably held in place, and the third rings will not move relative to each other so that the mold cavity formed therein will not be deformed. The strength of the third rings 40 is excellent.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mold comprising generally a pair of bodies engageable with each other, each of said bodies including an annular recess, an annular groove and an annular depression formed therein; a first ring engaged in said annular recess of each of said bodies and having a shape corresponding to the bead portion of a tire; a second ring engaged in said annular groove of each of said bodies and having a shape corresponding to the side wall portion of said tire; at least one third ring engaged in said annular depression of each of said bodies and having a shape corresponding to the tread portion of said tire; a mold cavity for forming said tire being formed in said bodies, said first rings, said second rings, and said third rings; said third rings being disposed and arranged in parallel with each other so that said third rings can be stably and properly retained in said annular depressions of said bodies.

2. A mold according to claim 1, wherein each of said bodies has at least one air hole formed in an outer peripheral portion thereof, each of said annular depressions has an inner surface which is made rough, each of said third rings includes two side surfaces and an outer peripheral surface which are made rough so that an air passage will be formed among said third rings and said bodies and communicated with a respective air hole, whereby, air contained within said mold cavity may flow through said air passages and may flow out via said air holes.

3. A mold according to claim 1, wherein a first body includes an annular flange, and a second body includes an annular shoulder for engagement with said annular flange of said first body so that said first body will not move relative to said second body, and so that said mold cavity will not be deformed.

4. A mold comprising generally a pair of bodies engageable with each other, each of said bodies including an annular recess, an annular groove and an annular depression formed therein; a first ring engaged in said annular recess of each of said bodies and having a shape corresponding to the bead portion of a tire; a second ring engaged in said annular groove of each of said bodies and having a shape corresponding to the side wall portion of said tire; at least two third rings engaged in said annular depression of each of said bodies and having a shape corresponding to the tread portion of said tire; a mold cavity for forming said tire being formed in said bodies, said first rings, said second rings, and said third rings; said third rings having an identical outer diameter and being disposed and arranged in parallel with each other so that said third rings can be stably and properly retained in said annular depressions of said bodies.

* * * * *